United States Patent
Bermudez Perez

(10) Patent No.: US 6,439,071 B2
(45) Date of Patent: Aug. 27, 2002

(54) TRANSMISSION MECHANISM FOR TRANSFORMING A CONTINUOUS ROTATING MOTION INTO INTERMITTENT ROTATING MOTION AND A DEVICE FOR TRANSPORTING SHEETS OF LAMINAR MATERIAL WHICH IS PROVIDED WITH SUCH A DEVICE

(75) Inventor: Ramon Bermudez Perez, Barcelona (ES)

(73) Assignee: Iberica A.G., S.A., El Prat del Llobregat (ES)

( * ) Notice: Subject to any disclaimer, the term of this patent is extended or adjusted under 35 U.S.C. 154(b) by 24 days.

(21) Appl. No.: 09/771,722

(22) Filed: Jan. 19, 2001

(30) Foreign Application Priority Data

Jan. 21, 2000 (ES) ................................................ 0000118

(51) Int. Cl.⁷ .......................... F16H 21/28; F16H 21/32; B65H 5/02
(52) U.S. Cl. ................................ 74/40; 74/96; 271/268
(58) Field of Search ........................ 74/40, 96; 271/268

(56) References Cited

U.S. PATENT DOCUMENTS

| | | | | |
|---|---|---|---|---|
| 2,007,886 A | * | 7/1935 | Stussi | 271/12 |
| 3,368,414 A | * | 2/1968 | Scholin et al. | 74/68 |
| 3,633,238 A | * | 1/1972 | Parker | 15/250.21 |
| 3,693,209 A | * | 9/1972 | Winkelmann et al. | 15/250.21 |

FOREIGN PATENT DOCUMENTS

ES          482310          2/1980

\* cited by examiner

Primary Examiner—Allan D. Herrmann

(57) ABSTRACT

The transmission mechanism comprises a lever (12) which can rotate around an eccentric shaft (11) of a rotating disk-crank (10). The lever (12) is guided in its movement by cam means (15a) and acts upon an arm (19) which is attached for joint rotation to an output shaft (3). Advantageously the disk-crank (10) is driven through a connecting rod (8) from another disk-crank (1) which can rotate around a shaft which is different from that of the first disk-crank (10). It doesn't require adjustment or setting up and it has a low cost. The transport device has on the output shaft the wheels for drawing chains with transporting bars provided with clamps for the sheets.

8 Claims, 2 Drawing Sheets

TRANSMISSION MECHANISM FOR TRANSFORMING A CONTINUOUS ROTATING MOTION INTO INTERMITTENT ROTATING MOTION AND A DEVICE FOR TRANSPORTING SHEETS OF LAMINAR MATERIAL WHICH IS PROVIDED WITH SUCH A DEVICE

The present invention relates to a transmission mechanism for transforming a continuous rotating motion into an intermittent rotating motion, which comprises a rotating disk-crank and a kinematic chain that links said disk-crank with an output shaft with the cooperation of cam means; and it also relates to a device for transporting sheets of laminar material which is provided with such a transmission mechanism.

BACKGROUND OF THE INVENTION

Some machines for working sheets of laminar material, such as presses for cutting, cutting out, die-cutting, scoring and/or embossing sheet materials such as paper, cardboard, wood, plastics and the like require the sheets of material to be transported along a path in an intermittent manner, so as to carry out a number of operations on them.

For this purpose, the machines have transporting devices for such sheets which consist in transversal bars of clamps regularly spaced along endless chains. The chains are driven with an intermittent motion, so that the bars are drawn intermittently.

A transporting device of this type is described in patent ES 482310 from the Applicant. In that device, the constant-speed rotation of an organ of the machine is transformed into an intermittent rotation of the shaft driving the chains by means of a transmission mechanism which includes a toothed segment.

This transmission mechanism is satisfactory in general, but it has the disadvantage of requiring a considerable amount of assembly, adjustment and set-up work. Furthermore, for some applications it is excessively bulky.

DESCRIPTION OF THE INVENTION

The aim of the present invention is to solve the mentioned drawbacks by developing a transmission mechanism that does not require complicated adjustment and setting up and that has a low execution cost.

In accordance with this aim, the mechanism of the present invention is characterised in that said kinematic chain includes a lever mounted so as to rotate freely on a shaft fixed in an eccentric position of said disk-crank, and in that said lever is guided in its movement by said cam means and acts upon a driving arm which is attached for joint rotation to the output shaft.

The lever and arm system which replaces the toothed sector of the prior art reduces the cost of the mechanism both in terms of its execution and due to the fact that setting up is eliminated.

In one embodiment, the lever acts upon the driving arm through a connecting rod which is hinged on one side to a shaft fixed onto the lever and on the other side to an eccentric shaft of the driving arm.

Preferably, the aforesaid cam means include a fixed cam, while the lever has a shaft fixed thereto and provided with bearing elements, which is coupled to the fixed cam.

In one particularly advantageous embodiment of the invention, the aforesaid disk-crank is driven from a second disk-crank by means of a connecting rod hinged between two eccentric shafts of the two disk-cranks, said second disk-crank being mounted so as to rotate around a shaft which is offset with respect to the rotating shaft of the first disk-crank.

The presence of two disks having different centres produces an oscillating movement within the cycle, which means that large level differences or jumps in the cam means can be avoided, thereby reducing the overall size of the mechanism and the magnitude of stresses.

In accordance with one embodiment, the second disk-crank is driven in rotation through a safety clutch.

In accordance with one particular method of construction, the first disk-crank is mounted so as to rotate freely on the output shaft itself. The size of the mechanism is reduced thereby.

In another aspect, the invention relates to a device for transporting sheets of laminar material which is provided with a transmission mechanism such as that described.

Advantageously, the transporting device is such that the output shaft has drawing wheels mounted on it for drawing chains with transporting bars provided with clamps for gripping the sheets to be transported.

BRIEF DESCRIPTION OF THE DRAWINGS

For a better understanding of all that has been outlined, some drawings are attached which, schematically and solely by way of non-restrictive example, show a practical case of embodiment.

In said drawings.

DESCRIPTION OF A PREFERRED EMBODIMENT

In the embodiment shown in the figures, the transmission mechanism of the invention is arranged between a disk-crank 1, mounted on a shaft 2 and driven from an organ of the machine to which the mechanism is applied, and an output shaft 3, which in this case has a centre which is offset from that of the shaft 2.

Figure 2:
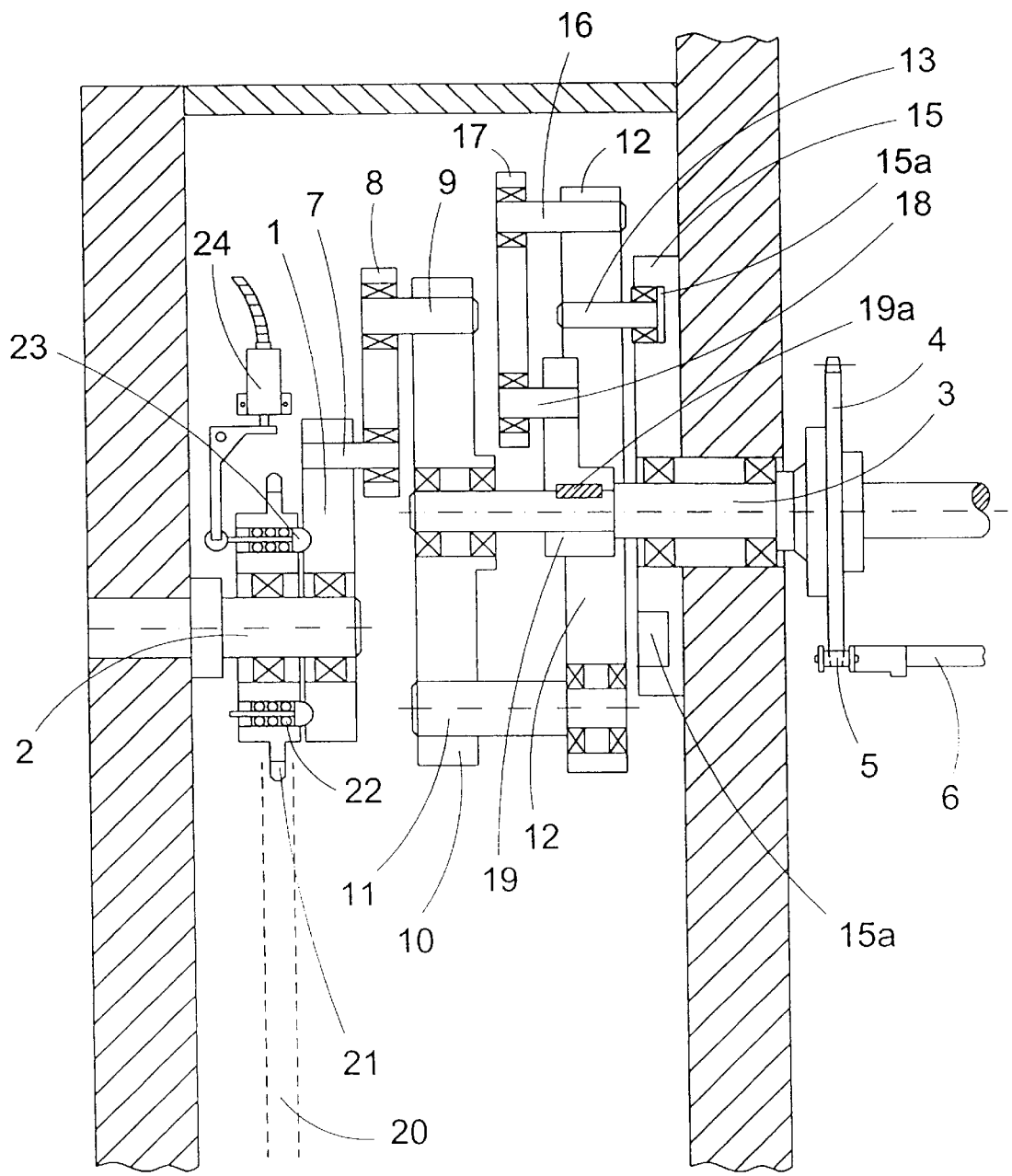
FIG. 2 shows schematically an axial section along a horizontal plane of the same mechanism, in another operating position, applied in this case to a device for transporting sheets of laminar material.

In FIG. 2, which shows the mechanism applied to a device for transporting sheets of laminar material, the shaft 3 bears wheels 4 for driving chains 5 that carry the bars of clamps 6 which draw the sheets.

The transmission mechanism includes a disk-crank 1, mounted on a shaft 2, which gives one turn in each work cycle, doing so constantly and regularly; the disk-crank 1 has another fixed shaft 7, situated eccentrically, near one of its ends, on which is mounted in free rotation a connecting rod 8, which is connected at its other end by a rotating shaft 9 to a point of a second disk-crank 10, which rotates freely at the centre of the shaft 3, bearing the wheels 4 which drive the carrying bars 6. Said second disk-crank 10 in turn has at another of its ends a shaft 11 carrying a lever 12 which rotates freely. This lever 12 also has two shaft centres, with one shaft 13 carrying bearing elements on its end, said bearing elements sliding in contact with a fixed guiding cam 15a having the shape of a slot made in a plate 15 fixed to the machine, which gives rise to an oscillating movement of the lever 12, when the latter rotates. The other shaft 16 in turn bears a connecting rod 17 which takes up the movement resulting from rotating the disk-crank 1, eccentric to the disk-crank 10, together with the oscillating movement caused by the cam 15a on the lever 12; said connecting rod 17 transmits the movement through its other rotating shaft 18, arranged at its other end, which is attached to an arm which is in turn fixed, for example by means of a key 19a, to the shaft 3 which finally receives the resulting movement.

Figure 1:
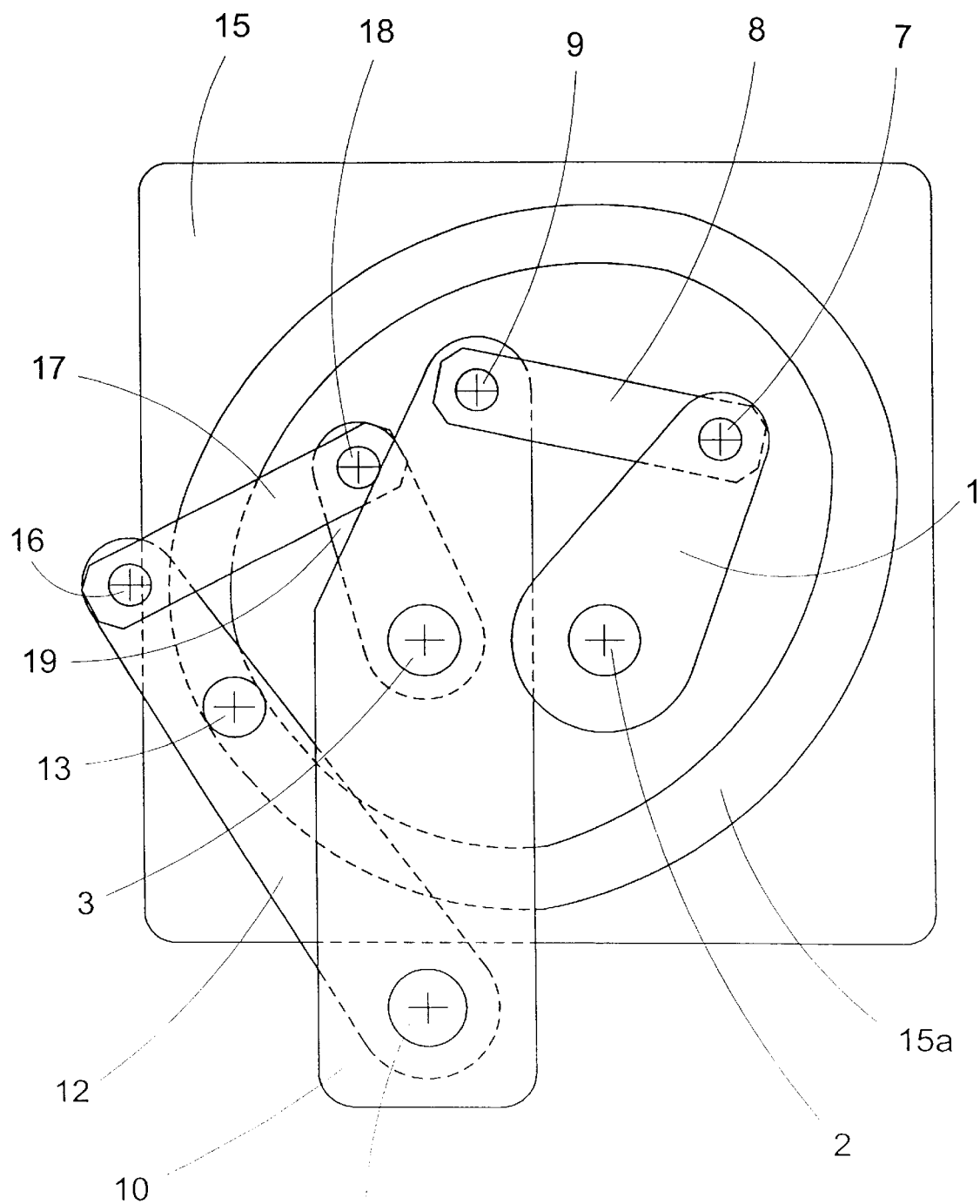
FIG. 1 shows an elevation view of a transmission mechanism in accordance with the invention.

The guiding cam 15a has a profile (see FIG. 1) such that at each turn of the second disk-crank 10 it gives rise to reciprocating oscillation of the lever 12. The connecting rod 17 describes the movement obtained as a result of the discontinuous cyclic rotation of the disk-crank 10 and the oscillation of the lever 12 produced by the cam.

As a result, at each turn of the disk-crank 1 the off-centre oscillation between the two disks and the reciprocating motion of the lever 12 caused by the cam lead to arresting of the rotation of the output shaft 3 and, as a result, real arrest of the rotation of the wheels 4 and the chains 5 bearing the bars of clamps 6.

Rotation is transmitted to the disk-crank 1 from any moving organ of the machine; for example, as can be seen in FIG. 2, it can be driven from a chain 20 and a pinion 21, through a safety clutch made up of spring devices 22 that can be adjusted at will and that act upon pin heads 23 which engage into corresponding recesses provided in the surface of the disk-crank 1, in such a way that they permit any excess stress to be compensated, permitting free rotation of the wheel or pinion 21.

The stems of the pin heads 23 are associated to a microswitch 24 or the like which is actuated when the stems project during the forced rotation of the wheel 21, thereby allowing to stop the movement of the machine.

Although one specific embodiment of this invention has been described and shown, it is obvious that a skilled man would be able to introduce variants and modifications or to replace details with others that are technically equivalent, without departing from the scope of protection defined in the attached claims.

Thus, for example, the guiding cam 15a could be made tip of two or more cams, or a double cam, etc., which would not necessarily have to be static, but could have relative movements.

Conventional dampening means could also be provided in order to absorb the kinetic energy produced by the transmission mechanism.

By way of example, another form of embodiment would consist in the wheel 21 acting directly on the second disk-crank 10, leaving aside the disk-crank 1 and the connecting rod 8, with all rotating concentrically to the output shaft 3. This solution shares the advantage of not requiring adjustment and is cheaper, but it has the disadvantage that the cam 15a would have to take up all the variations, leading to a long stroke thereof, since the oscillation due to the distance between centres of the two disk-plates would no longer be provided.

Finally, it should be noted that although the transmission mechanism has been described herein in association with a device for transporting sheets, it can be applied to other machines and devices in which the continuous rotation of a shaft has to be converted into an intermittent motion.

I claim:

1. A transmission mechanism for transforming a continuous rotating motion into an intermittent rotating motion, which comprises a rotating disk-crank (10) and a kinematic chain that links said disk-crank (10) with an output shaft (3) with the cooperation of cam means (15a), characterised in that said kinematic chain includes a lever (12) mounted so as to rotate freely on a shaft (11) fixed in an eccentric position of said disk-crank (10), and in that said lever (12) is guided in its movement by said cam means (15a) and acts upon a driving arm (19) which is attached for joint rotation to the output shaft (3).

2. A mechanism as claimed in claim 1, characterised in that the lever (12) acts upon the driving arm (19) through a connecting rod (17) which is hinged on one side to a shaft (16) fixed onto the lever (12) and on the other side to an eccentric shaft (18) of the driving arm (19).

3. A mechanism as claimed in either of claims 1 or 2, characterised in that the aforesaid cam means include a fixed cam (15a) and in that the lever (12) has a shaft (13) fixed thereto and provided with bearing elements, which is coupled to the fixed cam (15a).

4. A mechanism as claimed in any of claims 1 to 3, characterised in that the aforesaid disk-crank (10) is driven from a second disk-crank (1) by means of a connecting rod (8) hinged between two eccentric shafts (7,9) of the two disk-cranks (1,10), said second disk-crank (1) being mounted so as to rotate around a shaft (2) which is offset with respect to the rotating shaft of the first disk-crank (10).

5. A mechanism as claimed in claim 4, characterised in that the second disk-crank (1) is driven in rotation through a safety clutch (22,23).

6. A mechanism as claimed in any of the previous claims, characterised in that the first disk-crank (10) is mounted so as to rotate freely on the output shaft (3) itself.

7. A device for transporting sheets of laminar material, characterised in that it is provided with a transmission mechanism as claimed in any of claims 1 to 6.

8. A transporting device as claimed in claim 7, characterised in that the output shaft (3) has drawing heels (4) mounted on it for drawing chains (5) with transporting bars (6) provided with clamps for gripping the sheets to be transported.

* * * * *

UNITED STATES PATENT AND TRADEMARK OFFICE
CERTIFICATE OF CORRECTION

PATENT NO.    : 6,439,071 B2
DATED         : September 4, 2002
INVENTOR(S)   : Ramon Bermúdez Pérez It is certified that error appears in the above-identified patent and that said Letters Patent is hereby corrected as shown below:

<u>Title page,</u>
Item [30], Foreign Application Priority Data, "0000118" should read -- 20000118 --

Signed and Sealed this

Fourteenth Day of January, 2003

JAMES E. ROGAN
*Director of the United States Patent and Trademark Office*